(12) United States Patent
Gardner et al.

(10) Patent No.: US 10,428,536 B2
(45) Date of Patent: Oct. 1, 2019

(54) SCAFFOLD SYSTEM

(71) Applicant: International Chimney Corporation, Williamsville, NY (US)

(72) Inventors: George R. Gardner, East Amherst, NY (US); Edmund P. Gasiecki, Cheektowaga, NY (US)

(73) Assignee: International Chimney Corporation, Williamsville, NY (US)

( * ) Notice: Subject to any disclaimer, the term of this patent is extended or adjusted under 35 U.S.C. 154(b) by 334 days.

(21) Appl. No.: 14/143,148

(22) Filed: Dec. 30, 2013

(65) Prior Publication Data

US 2015/0184402 A1   Jul. 2, 2015

(51) Int. Cl.
| | |
|---|---|
| *E04G 3/28* | (2006.01) |
| *E04G 3/20* | (2006.01) |
| *E04G 3/24* | (2006.01) |
| *E04G 5/06* | (2006.01) |

(52) U.S. Cl.
CPC .................. *E04G 3/28* (2013.01); *E04G 3/20* (2013.01); *E04G 3/246* (2013.01); *E04G 5/06* (2013.01); *E04G 2003/286* (2013.01)

(58) Field of Classification Search
CPC .... E04G 5/04; E04G 5/06; E04G 1/18; E04G 1/20; E04G 1/22; E04G 3/20; E04G 3/28; E04G 3/00; E04G 2003/28; E04G 2003/286; E04G 11/22; E04G 11/24; E04G 11/28
See application file for complete search history.

(56) References Cited

U.S. PATENT DOCUMENTS

| | | | |
|---|---|---|---|
| 898,368 A | * | 9/1908 | Humpheries ............. E04G 5/04 182/87 |
| 2,673,711 A | | 10/1951 | Lutton |
| 2,718,378 A | | 9/1955 | Lutton |
| | | (Continued) | |

FOREIGN PATENT DOCUMENTS

| | | | | |
|---|---|---|---|---|
| CA | 2313513 A1 | * | 1/2002 | ............... E04G 1/20 |
| CA | 2313513 A1 | * | 1/2002 | ............... E04G 1/20 |
| | (Continued) | | | |

*Primary Examiner* — Katherine W Mitchell
*Assistant Examiner* — Candace L Bradford
(74) *Attorney, Agent, or Firm* — Simpson & Simpson, PLLC

(57) ABSTRACT

A scaffold system adapted for securing to a structure and for vertical movement relative to the structure. The scaffold system includes first and second wall mounts, each of the wall mounts having a bar and at least one spring biasing the bar in a first direction, a slide post having a slide hook, a slide arm and a hanging pad secured to the slide arm, the slide post arranged for vertical axial movement within at least one of the first and second wall mounts, a main post having at least one post hook, a first deck fixedly secured to the main post, and a ball screw jack having a mounting plate and a lifting screw, the mounting plate secured to the first deck and the lifting screw secured to the hanging pad. The main post is arranged to complementarily fit within slide post, the slide hook is adapted for releasable engagement with the first wall mount bar or the second wall mount bar and the at least one post hook is adapted for releasable engagement with the first wall mount bar or the second wall mount bar.

11 Claims, 9 Drawing Sheets

(56) References Cited

U.S. PATENT DOCUMENTS

| | | | | |
|---|---|---|---|---|
| 2,762,659 | A | * | 9/1956 | Harlan .................... E04G 1/22 182/141 |
| 2,882,100 | A | * | 4/1959 | Bank ....................... E04G 5/00 182/115 |
| 2,893,786 | A | * | 7/1959 | Faye ....................... E04G 3/20 182/229 |
| 3,148,857 | A | * | 9/1964 | Hutchison ................ E04G 5/06 108/135 |
| 3,371,551 | A | * | 3/1968 | Profet ................... F16H 25/2223 74/424.86 |
| 4,040,774 | A | * | 8/1977 | Scheller .................. E04G 11/28 249/20 |
| 4,078,633 | A | * | 3/1978 | Fahy ....................... E04G 1/20 182/145 |
| 4,157,129 | A | * | 6/1979 | Christopher ............ E04G 1/20 182/82 |
| 4,275,797 | A | | 6/1981 | Johnson |
| 4,276,957 | A | * | 7/1981 | Kilgore .................... E04G 3/22 182/130 |
| 4,476,958 | A | | 10/1984 | Stafford |
| 4,498,556 | A | * | 2/1985 | Garton .................... B66F 11/04 182/19 |
| 4,690,606 | A | * | 9/1987 | Ross ....................... B64F 1/32 187/214 |
| 4,817,759 | A | * | 4/1989 | Galyardt ................. E04G 3/18 182/36 |
| 4,962,828 | A | * | 10/1990 | Duncan ................... E04G 21/3223 182/82 |
| 5,099,953 | A | | 3/1992 | Stegath |
| 5,152,369 | A | | 10/1992 | Nakaoka |
| 5,285,869 | A | | 2/1994 | Rock |
| 5,505,318 | A | * | 4/1996 | Goff ....................... A47B 46/00 211/132.1 |
| 5,579,866 | A | | 12/1996 | Rowell |
| 5,588,500 | A | | 12/1996 | Yonahara |
| 5,810,114 | A | | 9/1998 | White |
| 5,909,783 | A | | 6/1999 | Berish |
| 6,220,391 | B1 | | 4/2001 | White |
| 6,431,316 | B1 | | 8/2002 | Bothwell |
| 6,443,262 | B1 | | 9/2002 | Karanough |
| 6,557,817 | B2 | * | 5/2003 | Waldschmitt ........... E04G 11/28 182/36 |
| 6,695,097 | B1 | | 2/2004 | Wiklund |
| 6,883,642 | B2 | | 4/2005 | Matty |
| 7,140,467 | B2 | * | 11/2006 | Cook ...................... B60R 3/005 182/143 |
| 7,188,707 | B2 | | 3/2007 | Bothwell et al. |
| 8,302,735 | B2 | | 11/2012 | Anasis et al. |
| 2006/0124392 | A1 | * | 6/2006 | Evinger ................... E04G 3/28 182/82 |
| 2006/0163001 | A1 | * | 7/2006 | Pozell ..................... E04G 3/20 182/82 |
| 2007/0000724 | A1 | | 1/2007 | Anasis et al. |
| 2007/0119116 | A1 | * | 5/2007 | Arozena Bergaretxe ................... E04G 11/28 52/633 |
| 2007/0278041 | A1 | | 12/2007 | Cosgrove et al. |
| 2008/0179477 | A1 | | 7/2008 | Harney |
| 2009/0173574 | A1 | * | 7/2009 | Hobmeier ............... E04G 11/28 182/82 |
| 2012/0247870 | A1 | * | 10/2012 | Iturbe Beristain ......................... E04G 21/3247 182/82 |
| 2012/0312940 | A1 | * | 12/2012 | Julliard .................... E04G 3/22 248/200.1 |
| 2013/0081902 | A1 | * | 4/2013 | Liao ........................ E04G 3/28 182/20 |

FOREIGN PATENT DOCUMENTS

| | | | | |
|---|---|---|---|---|
| DE | 1116378 | B | * 11/1961 | .............. E04G 5/04 |
| DE | 1116378 | B | * 11/1961 | .............. E04G 5/04 |
| DE | 2921636 | A1 | * 12/1980 | .............. E04G 3/28 |
| DE | 2921636 | A1 | * 12/1980 | .............. E04G 3/28 |
| DE | 8702952 | U1 | * 9/1987 | ........... E04B 1/4121 |
| FR | 340379 | A | * 7/1904 | .............. E04G 5/04 |
| FR | 340379 | A | * 7/1904 | .............. E04G 5/04 |
| FR | 2487410 | A1 | * 1/1982 | .............. E04G 3/28 |
| FR | 2487410 | A1 | * 1/1982 | .............. E04G 11/28 |
| GB | 2112440 | A | * 7/1983 | .............. E04G 3/20 |
| GB | 2112440 | A | * 7/1983 | .............. E04G 3/20 |
| JP | 8119589 | | 5/1996 | |
| JP | 2000001984 | | 1/2000 | |
| WO | 93/02263 | | 2/1993 | |
| WO | WO-2013185277 | A1 | * 12/2013 | ............. E04G 11/28 |
| WO | WO 2013185277 | A1 | * 12/2013 | ............. E04G 11/28 |

* cited by examiner

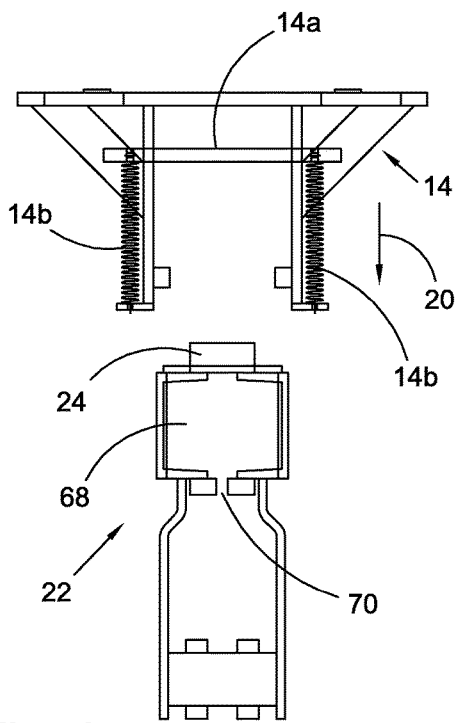
Fig. 8
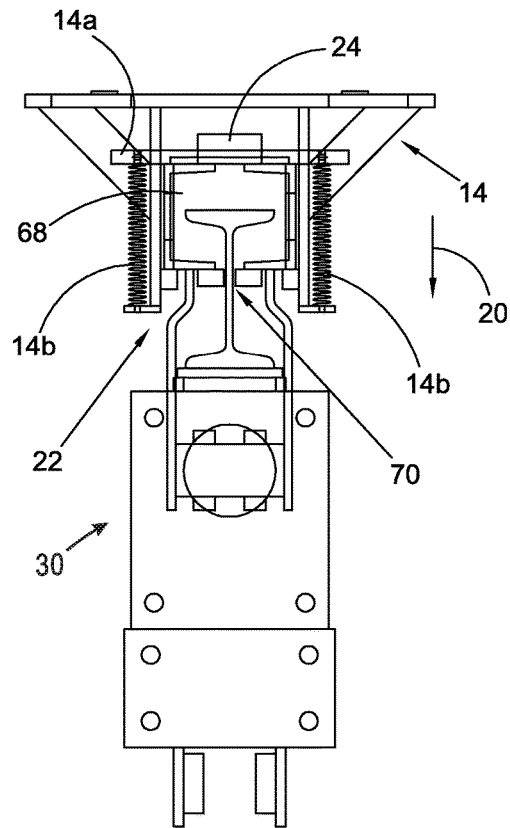
Fig. 7
Fig. 9
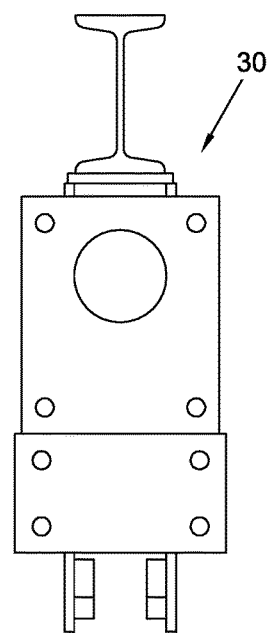
Fig. 10

SCAFFOLD SYSTEM

FIELD OF THE INVENTION

The invention broadly relates to scaffold systems, more specifically to a height adjustable scaffold system, and even more particularly to a height adjustable scaffold system adapted to be repositionable throughout its range of use along the full height of a structure.

BACKGROUND OF THE INVENTION

Scaffold systems are often assembled as static structures. For example, ground based scaffolds and scaffolds securely affixed to the side of a structure are commonly used for construction and demolition work. Such structures must be at least partially disassembled in order to be moved to a different location, e.g., height, or in the alternatively, additionally elements, e.g., frames, must be added to the original structure in order to increase the overall height. Changes of this type are time consuming and may require multiple people to assist with the process to ensure a safe transition. Moreover, forming extremely large scaffold structures requires a large number of frames and boards thereby increasing the cost of building the structure.

Some scaffold systems may be moved vertically through the use of complex pulley and motor systems. For example, window washing scaffolds are mounted from a crane like apparatus on the roof of a building via cables connecting the scaffold to the crane motor. The height of the scaffold is altered by activating the crane thereby causing the scaffold to raise or lower. Such arrangements require the mounting of an additional apparatus, i.e., a crane, and further require clear paths for cables to extend from the crane to the scaffold. Other systems use hydraulic cylinders to move a scaffold up or down. Hydraulic cylinders require a hydraulic power pack, and a hydraulic power pack is bulky and reduces the load capacity of the scaffold. Moreover, such power packs are electronically powered.

As can be derived from the variety of devices and methods directed to securing a scaffold and subsequently altering its position, many means have been contemplated to accomplish the desired end, i.e., safe, controlled movement a scaffold. Heretofore, tradeoffs between complexity, cost and range of motion were required. Thus, there is a long-felt need for a scaffold that minimizes the number of components needed to alter the position of the scaffold while maintaining the necessary safety of the structure.

BRIEF SUMMARY OF THE INVENTION

The present invention broadly comprises a scaffold system adapted for securing to a structure and for vertical movement relative to the structure. The scaffold system includes first and second wall mounts, each of the wall mounts having a bar and at least one spring biasing the bar in a first direction, a slide post having a slide hook, a slide arm and a hanging pad secured to the slide arm, the slide post arranged for vertical axial movement within at least one of the first and second wall mounts, a main post having at least one post hook, a first deck fixedly secured to the main post, and a ball screw jack having a mounting plate and a lifting screw, the mounting plate secured to the first deck and the lifting screw secured to the hanging pad. The main post is arranged to complementarily fit within slide post, the slide hook is adapted for releasable engagement with the first wall mount bar or the second wall mount bar and the at least one post hook is adapted for releasable engagement with the first wall mount bar or the second wall mount bar.

In an embodiment, the first wall mount is secured to the structure at a first height, the second wall mount is secured to the structure at a second height elevationally lower than the first height and the slide hook is releasably engaged with the first wall mount bar. In an embodiment, the first wall mount is secured to the structure at a first height, the second wall mount is secured to the structure at a second height elevationally lower than the first height and the at least one post hook is releasably engaged with the second wall mount bar. In an embodiment, the first wall mount is secured to the structure at a first height, the second wall mount is secured to the structure at a second height elevationally lower than the first height, the slide hook is releasably engaged with the first wall mount bar and the at least one post hook is releasably engaged with the second wall mount bar.

In an embodiment, the scaffold system further includes a third wall mount having a bar and at least one spring biasing the bar in a first direction, wherein the first wall mount is secured to the structure at a first height, the second wall mount is secured to the structure at a second height elevationally lower than the first height, the third wall mount is secured to the structure at a third height elevationally lower than the second height and the slide hook is releasably engaged with the first wall mount bar and the at least one post hook is releasably engaged with the third wall mount bar. In an embodiment, the scaffold system further includes a third wall mount having a bar and at least one spring biasing the bar in a first direction, wherein the first wall mount is secured to the structure at a first height, the second wall mount is secured to the structure at a second height elevationally lower than the first height, the third wall mount is secured to the structure at a third height elevationally higher than the first height and the slide hook is releasably engaged with the third wall mount bar and the at least one post hook is releasably engaged with the first wall mount bar or the second wall mount bar.

In an embodiment, the scaffold system further includes at least one limit switch arranged to engage the hanging pad or the slide arm. In an embodiment, the scaffold system further includes a second deck positioned elevationally higher than the first deck. In an embodiment, the scaffold system further includes at least one safety lug secured to the structure and the first deck.

The present invention further broadly comprises a method of modifying the height of a scaffold system mounted on a structure. The scaffold system includes first and second wall mounts, a slide post having a slide hook, a slide arm and a hanging pad secured to the slide arm, a main post having at least one post hook, a first deck fixedly secured to the main post, and a ball screw jack having a mounting plate and a lifting screw. Each of the wall mounts includes a bar and at least one spring biasing the bar in a first direction, the slide post is arranged for vertical axial movement within at least one of the first and second wall mounts, the mounting plate is secured to the first deck, the lifting screw is secured to the hanging pad, the main post is arranged to complementarily fit within slide post, the slide hook is adapted for releasable engagement with the first wall mount bar or the second wall mount bar and the at least one post hook is adapted for releasable engagement with the first wall mount bar or the second wall mount bar. The method includes: a) securing the first wall mount to the structure at a first height and securing the second wall mount to the structure at a second height elevationally lower than the first height; b) releasably engaging the at least one post hook with the second wall mount bar; c) releasably engaging the slide hook with the first wall mount bar; d) securing a third wall mount to the structure at a third height elevationally higher the first height, the third wall mount includes a bar and at least one spring biasing the bar in a first direction; e) energizing the ball screw jack, wherein the ball screw jack extends the lifting screw thereby increasing a vertical height of the slide post; f) releasably engaging the slide hook with the third wall mount bar; g) energizing the ball screw jack, wherein the ball screw jack retracts the lifting screw thereby increasing the vertical height of the main post; and, h) releasably engaging the at least one post hook with first wall mount bar.

The present invention yet further broadly comprises a method of modifying the height of a scaffold system mounted on a structure. The scaffold system includes first and second wall mounts, a slide post having a slide hook, a slide arm and a hanging pad secured to the slide arm, a main post having at least one post hook, a first deck fixedly secured to the main post, and a ball screw jack having a mounting plate and a lifting screw. Each of the wall mounts includes a bar and at least one spring biasing the bar in a first direction, the slide post is arranged for vertical axial movement within at least one of the first and second wall mounts, the mounting plate is secured to the first deck, the lifting screw is secured to the hanging pad, the main post is arranged to complementarily fit within slide post, the slide hook is adapted for releasable engagement with the first wall mount bar or the second wall mount bar and the at least one post hook is adapted for releasable engagement with the first wall mount bar or the second wall mount bar. The method includes: a) securing the first wall mount to the structure at a first height and securing the second wall mount to the structure at a second height elevationally lower than the first height; b) releasably engaging the at least one post hook with the second wall mount bar; c) releasably engaging the slide hook with the first wall mount bar; d) securing a third wall mount to the structure at a third height elevationally lower the second height, the third wall mount includes a bar and at least one spring biasing the bar in a first direction; e) energizing the ball screw jack, wherein the ball screw jack extends the lifting screw thereby decreasing a vertical height of the main post; f) releasably engaging the at least one post hook with the third wall mount bar; g) energizing the ball screw jack, wherein the ball screw jack retracts the lifting screw thereby decreasing the vertical height of the slide post; and, h) releasably engaging the slide hook with second wall mount bar.

It is a general object of the present invention to provide a moveable scaffold which can alter its vertical position along an entire height of a structure without the need for excessive materials or cost.

It is another general object of the present invention to maintain safety while modifying the position of a scaffold system.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 7 is a top plan view of an embodiment of a main post within a slide post wherein the slide post is releasably secured to a wall mount;

FIG. 8 is a top plan view of the wall mount of FIG. 7;

FIG. 9 is a top plan view of the slide post of FIG. 7;

FIG. 10 is a top plan view of the main post of FIG. 7;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
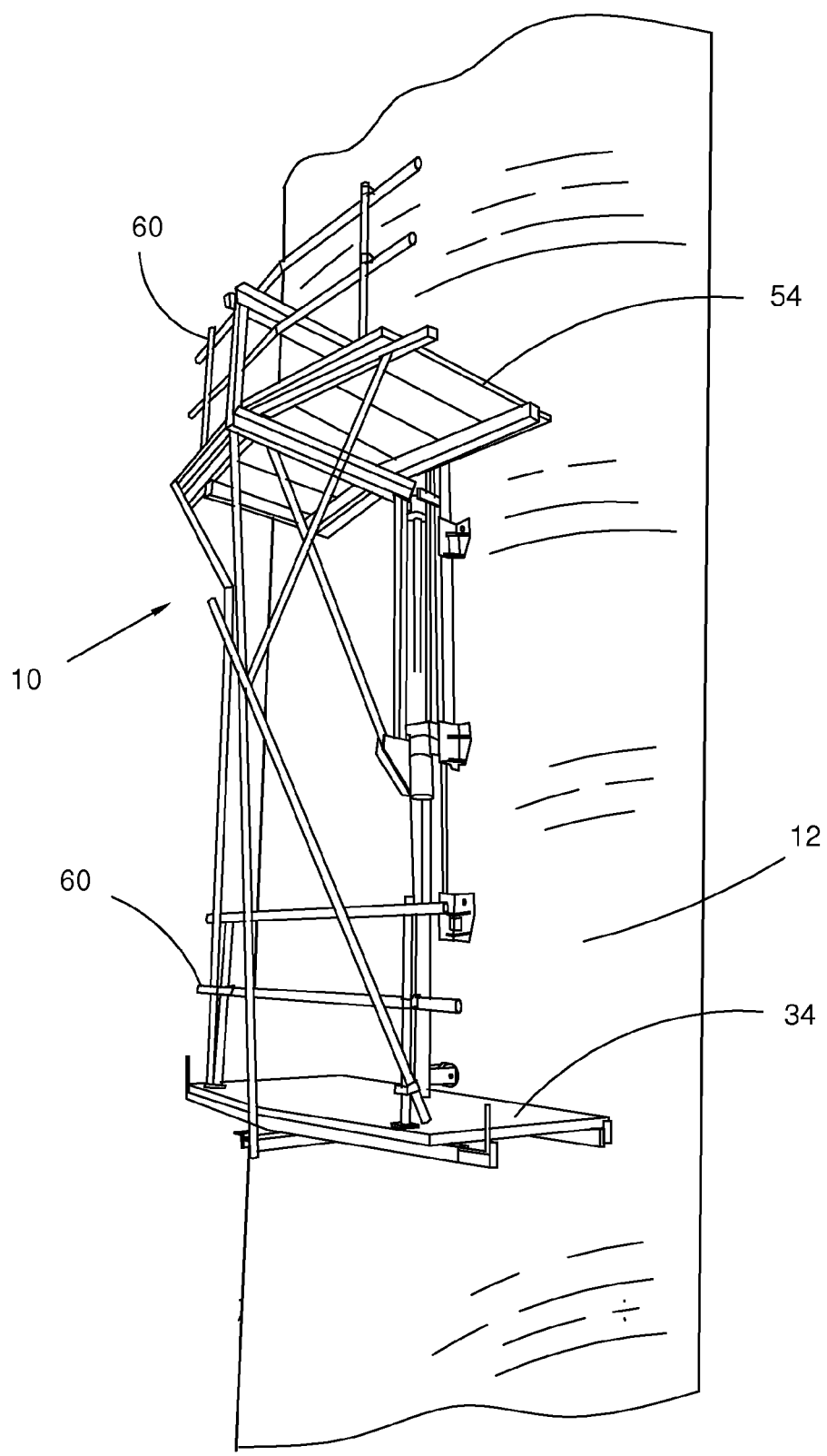
FIG. 1 is a perspective view of a structure, i.e., a chimney, having an embodiment of a present invention scaffold system secured thereto.
Figure 2:
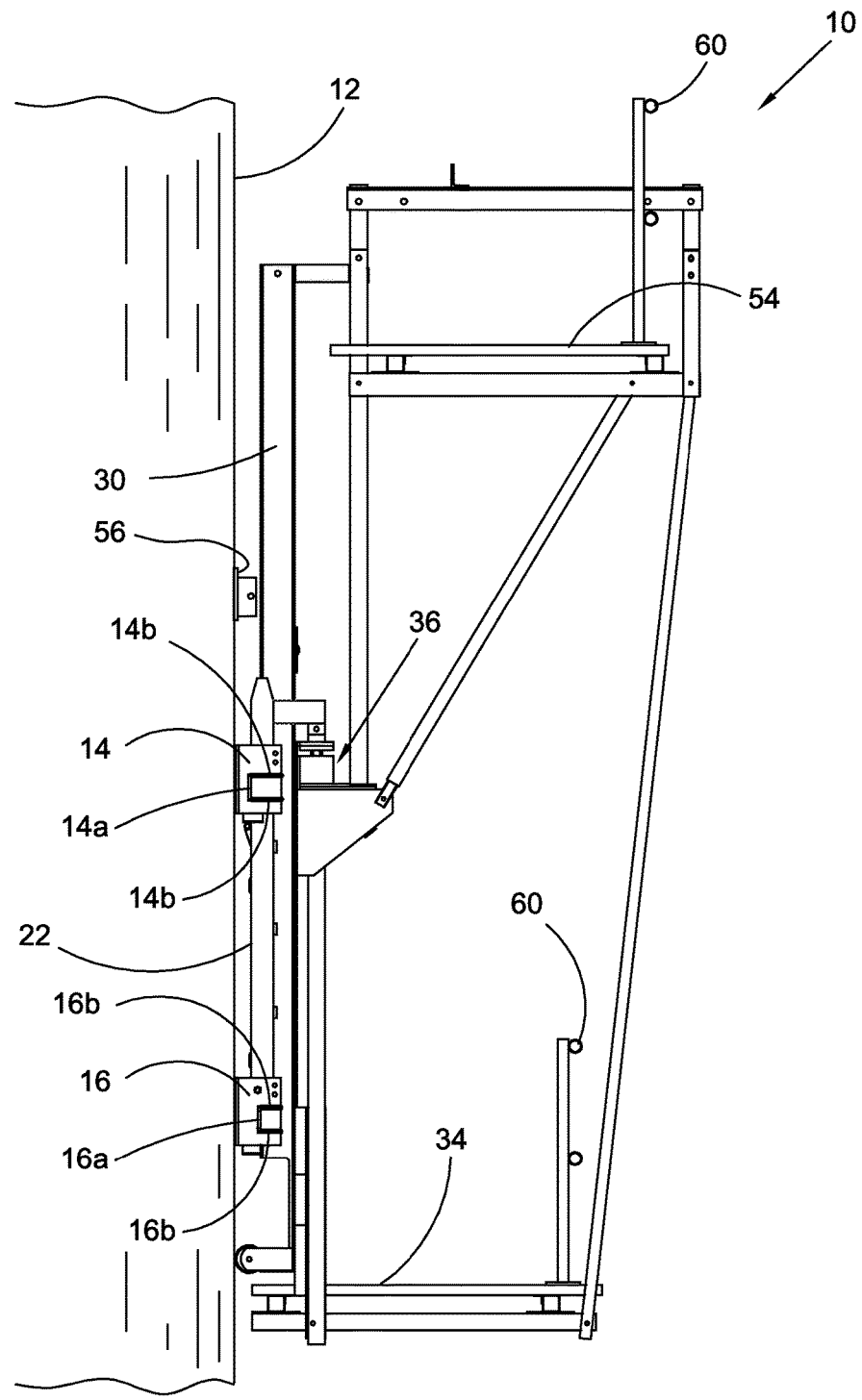
FIG. 2 is a side elevational view of an embodiment of a present invention scaffold system.
Figure 3:
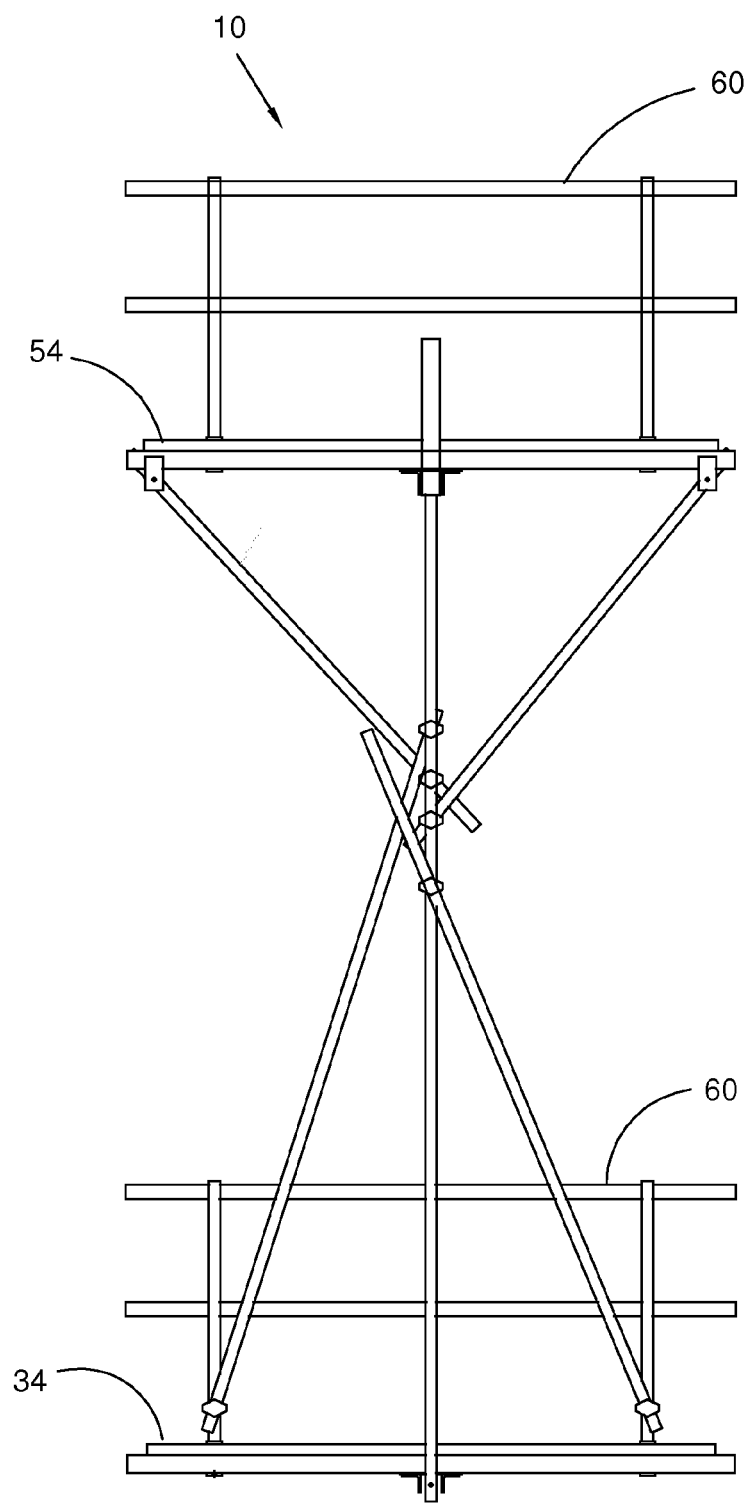
FIG. 3 is a front elevational view of an embodiment of a present invention scaffold system.
Figure 4:
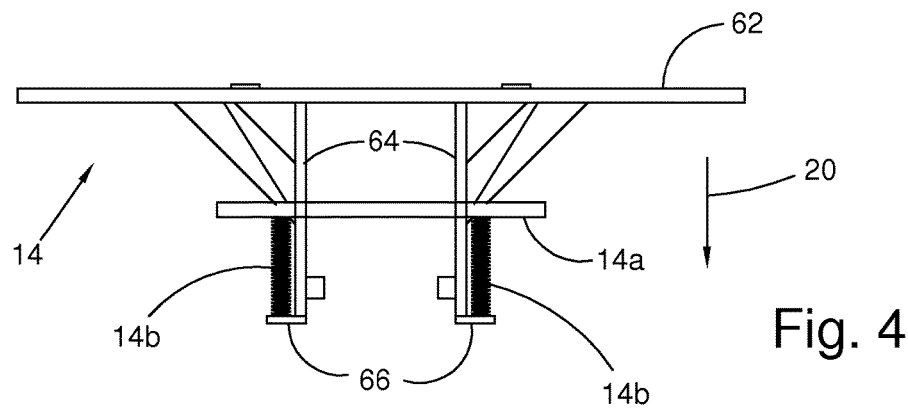
FIG. 4 is a top plan view of an embodiment of a wall mount.
Figure 5:
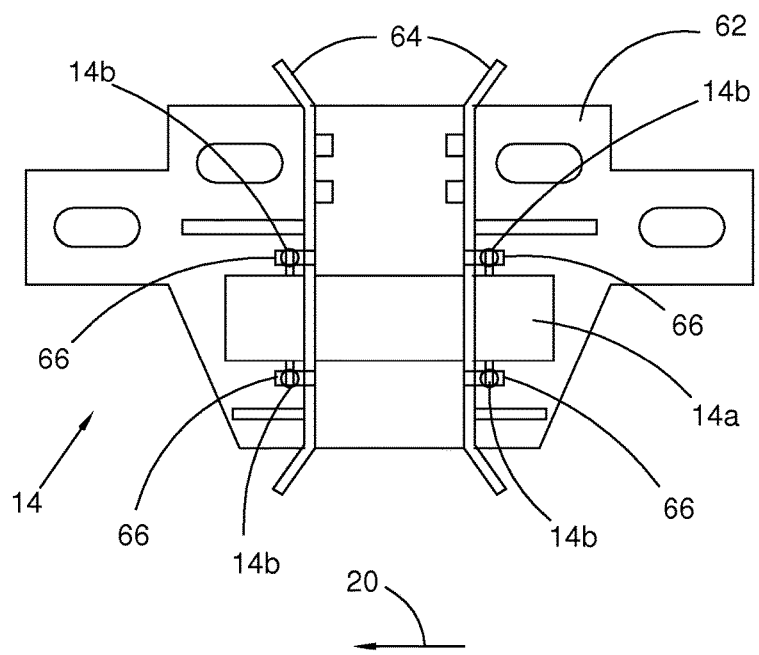
FIG. 5 is a front elevational view of the wall mount of FIG. 4.
Figure 6:
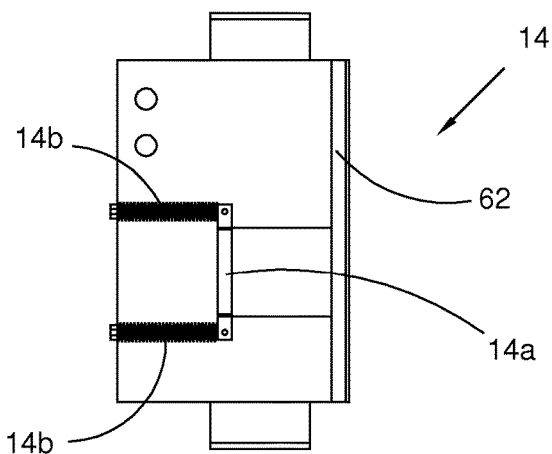
FIG. 6 is a side elevational view of the wall mount of FIG. 4.
Figure 11:
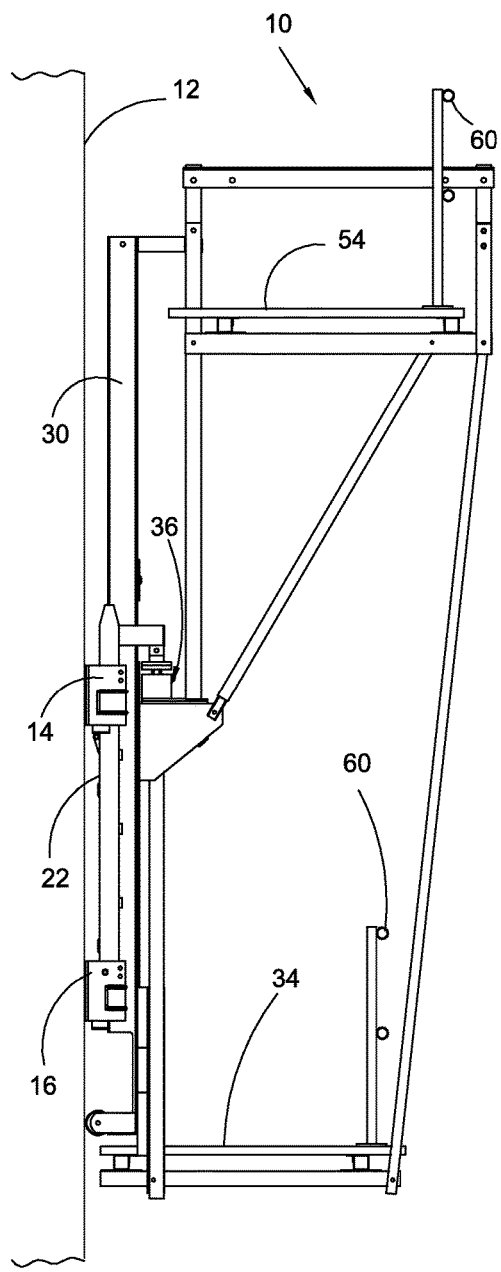
FIG. 11 is a side elevational view of an embodiment of a present invention scaffold system showing a ball screw jack in a retracted position.
Figure 12:
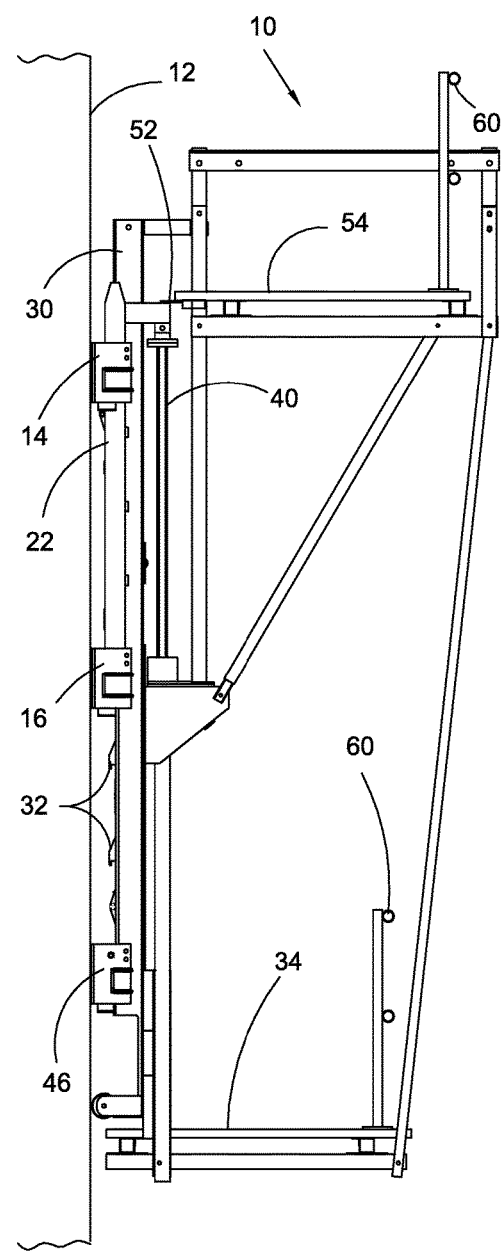
FIG. 12 is a side elevational view of an embodiment of a present invention scaffold system showing a ball screw jack in an extended position.

Adverting now to the figures, FIG. 1 shows a perspective view of an embodiment of the present invention scaffold system 10 mounted on chimney 12. The nature and mode of operation of scaffold 10 is best understood in view of FIG. 1 through 15.

Scaffold system 10 is adapted for securing to structure 12, e.g., a chimney, and for vertical movement relative to structure 12. Scaffold system 10 comprises first and second wall mounts 14 and 16, respectively. Each of wall mounts 14 and 16 comprise a bar, i.e., bars 14a and 16a, respectively, and at least one spring, i.e., springs 14b and 16b, respectively, which are arranged to bias the bar in a first direction, i.e., the direction depicted by uni-directional arrow 20. Scaffold system 10 further comprises slide post 22 comprising slide hook 24, slide arm 26 and hanging pad 28 secured to slide arm 26. Slide post 22 is arranged for vertical axial movement within at least one of first and second wall mounts 14 and 16, respectively. Scaffold system 10 further comprises main post 30 comprising post hooks 32 and still yet further comprises first deck 34 fixedly secured to main post 30. Scaffold system 10 further comprises ball screw jack 36 comprising mounting plate 38 and lifting screw 40. Mounting plate 38 is secured to first deck 34 and lifting screw 40 is secured to hanging pad 28. Main post 30 is arranged to complementarily fit within slide post 22. Slide hook 24 is adapted for releasable engagement with first wall mount bar 14a or second wall mount bar 16a, while post hooks 32 are adapted for releasable engagement with first wall mount bar 14a or the second wall mount bar 16a.

In an embodiment, first wall mount 14 is secured to structure 12 at a first height, e.g., height 42, and second wall mount 16 is secured to structure 12 at a second height elevationally lower than the first height, e.g., height 44. In an embodiment, slide hook 24 is releasably engaged with first wall mount bar 14a, while in another embodiment, one of post hooks 32 is releasably engaged with second wall mount bar 16a, and in yet another embodiment, slide hook 24 is releasably engaged with first wall mount bar 14a and one of post hooks 32 is releasably engaged with second wall mount bar 16a.

In an embodiment, ball screw jack 36 is a 10-ton ball screw jack. The jack is powered with a 220 volt single phase motor, and is equipped with a brake and pendant cord with an up-and-down switch to control the scaffold movement. Existing power cords are utilized to energize ball screw jack 36.

Figure 13:
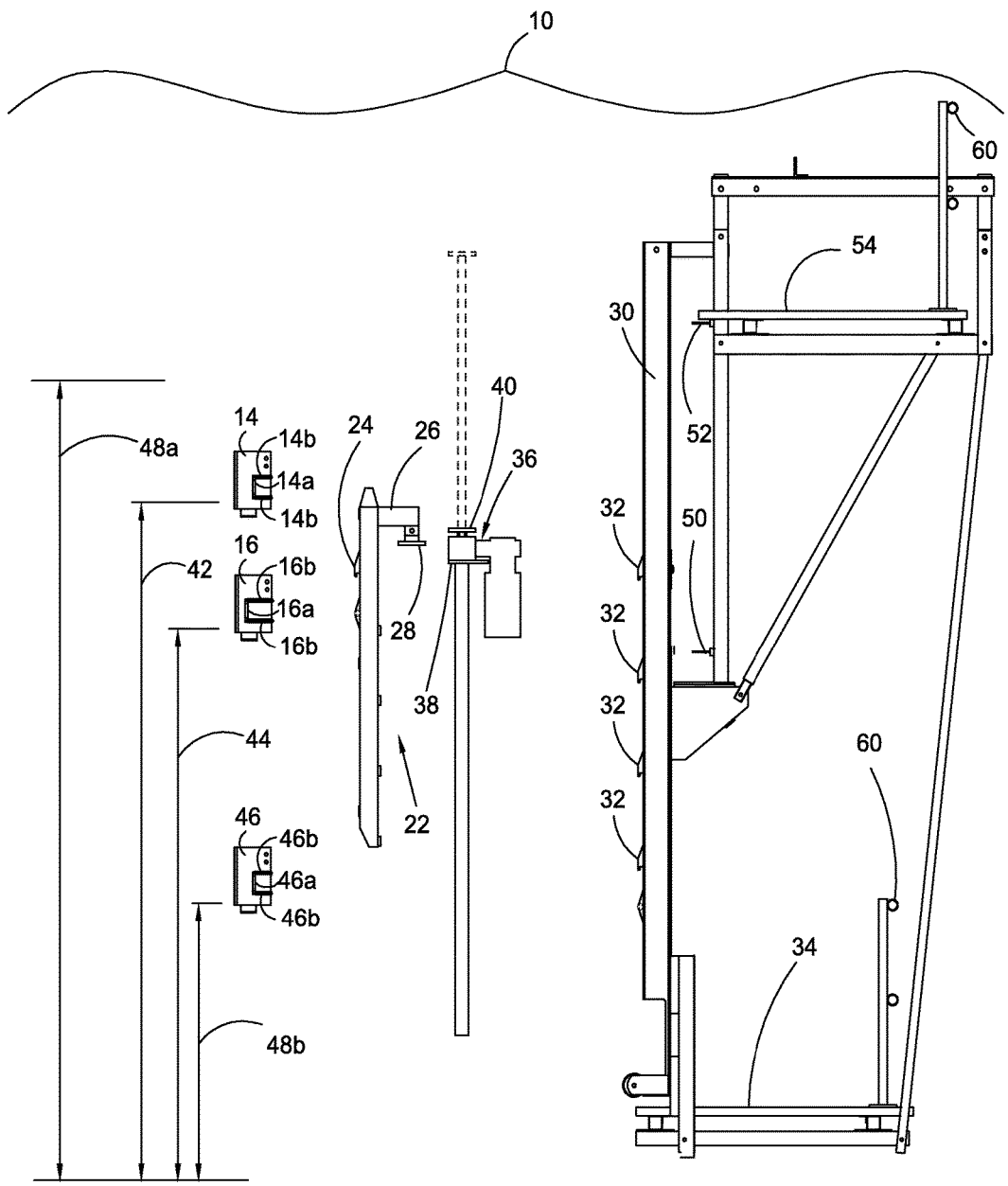
FIG. 13 is a side elevational exploded view of the embodiment of the scaffold system shown in FIG. 13.
Figure 14:
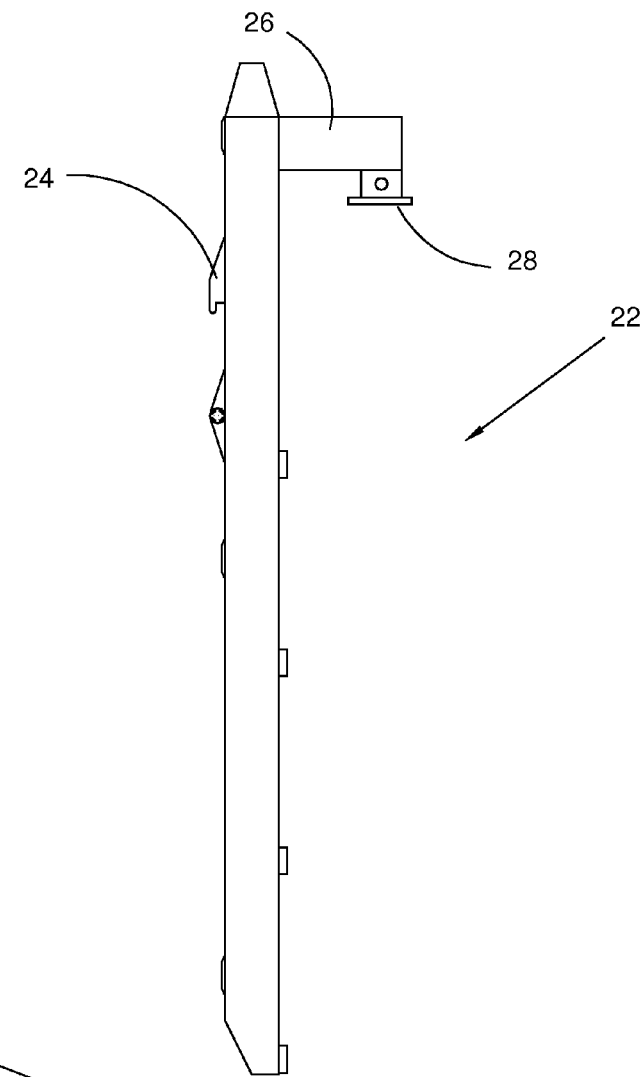
FIG. 14 is a side elevational view of an embodiment of a slide post.
Figure 15:
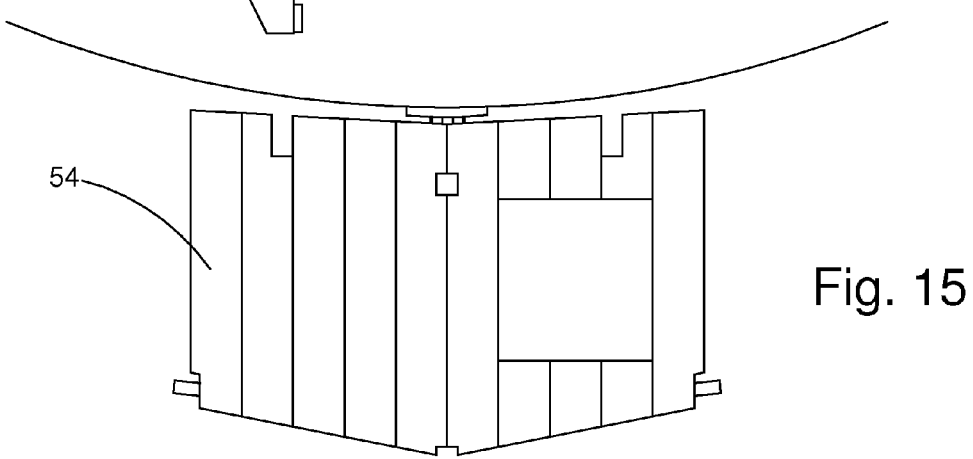
FIG. 15 is a top plan view of an embodiment of an upper deck having an access hole arranged therein; and, FIG. 16 is a front elevational view of an embodiment of a present invention scaffold system including two adjacent scaffold systems connected by a folding walkway.

In an embodiment, scaffold system 10 further comprises third wall mount 46 comprising a bar, i.e., bar 46a, and at least one spring, i.e., springs 46b. Springs 46b bias bar 46a in a first direction, i.e., the direction depicted by uni-directional arrow 20. In an embodiment, third wall mount 46 is secured to structure 12 at a third height elevationally lower than second height 44, e.g., height 48b. In an embodiment, slide hook 24 is releasably engaged with first wall mount bar 14a and post hook 32 is releasably engaged with third wall mount bar 46a. Additional embodiments are described below. For example, embodiments are set forth below where third wall mount 46 is secured to structure 12 at a third height elevational higher than first height 42, e.g., height 48a (as shown in FIG. 13).

In an embodiment, scaffold system 10 further comprises at least one limit switch, e.g., limit switches 50 and 52, arranged to engage hanging pad 28 when ball screw jack 36 is moving in a direction to retract lifting screw 40 or to engage slide arm 26 when ball screw jack 36 is moving in a direction to extend lifting screw 40. In view of the foregoing, it should be appreciated that limit switches provide feedback to the system regarding the position of ball screw jack 36, e.g., reaching its full extension or full refraction, thereby preventing damage to ball screw jack 36 and failure of scaffold system 10 by automatically stopping travel of the lifting mechanism. It should be further appreciated that a single limit switch may be used thereby detecting the position of ball screw jack 36 in a single location. Moreover, greater than two limit switches may be included thereby providing more detailed position information. The limit switch or switches are an added safety factor which helps eliminate human error.

In an embodiment, scaffold system 10 further comprises second deck 54 positioned elevationally higher than first deck 34. The arrangement of decks included with scaffold system 10 depends upon the needs of the user. For example, two levels may be needed, e.g., a first lower level for finish assembly work and a second upper level for preparation work. One of ordinary skill in the art will appreciate that more than two decks may also be included, e.g., three, and that the number of decks is limited by the structure of the scaffold and the size of the ball screw jack, e.g., 10-ton, 20-ton, etc., and such variations fall within the scope of the claims. In an embodiment, the upper working deck is eliminated from the scaffold when it is used as a demolition scaffold. The main support tubes of scaffold system 10 have been modified to allow the upper deck to be added as required for different job specific requirements, such as repair work.

As safety is critical with such structures, e.g., scaffolds may be mounted hundreds of feet above the ground, scaffold system 10 may include further safety features. For example, scaffold system 10 may comprise at least one safety lug, e.g., lug 56, secured to structure 12 and first deck 34. Safety lug 56 is anchored into structure 12. Lug 56 is then connected to individual scaffold sections with a steel choker and secured to the scaffold with a safety shackle secured at the top working deck. Lug 56 helps ensure the scaffold sections are secured to structure 12.

Figure 16:
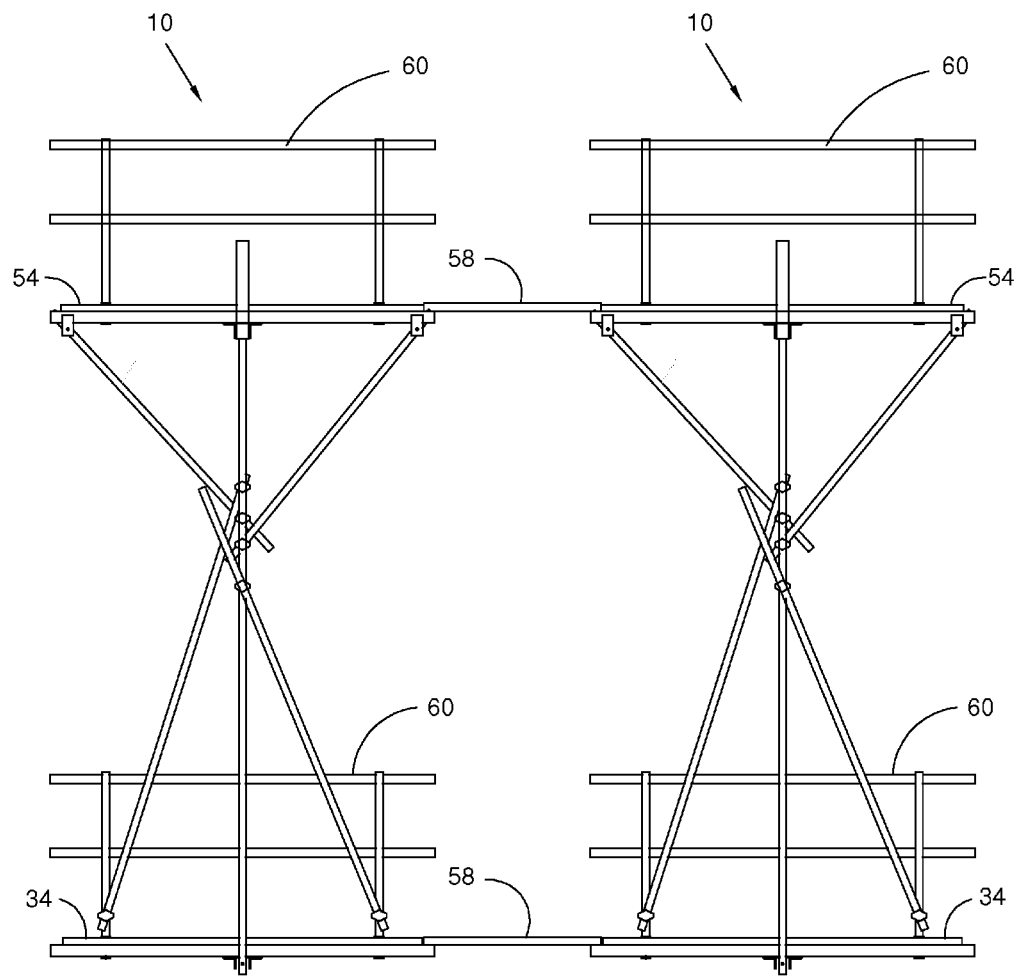

Furthermore, scaffold system 10 may include other safety equipment incorporated to maintain a safe working environment. In an embodiment, the scaffold system may be equipped with folding walkway 58 extending between adjacent scaffold systems (See FIG. 16), wherein the walkway minimizes or eliminates a tripping hazard as a user walks from one scaffold section to an adjacent scaffold section. Such safety equipment is essential when the scaffold systems are moving up or down. Moreover, the scaffold system may include hand rails 60, and at each open end of a deck, hand rails 60 may be equipped with a self-closing gate. The foregoing gates help secure the open ends of a deck thereby minimizing or eliminating fall hazards. The nature and mode of operation of such gates are well known to one having ordinary skill in the art.

First, second and third wall mounts 14, 16 and 46, respectively, share a similar structural arrangement. The structure of first wall mount 14 is described in detail herein. As each wall mount is configured in the same fashion, the description herein is applicable second and third wall mounts 16 and 46, respectively. Wall mount 14 comprises mounting plate 62 and side plates 64 extending therefrom. Side plates 64 comprise flanges 66. Springs 14b extend between flanges 66 and mount bar 14a. Springs 14b bias mount bar 14a in the direction of uni-directional arrow 20, thereby biasing mount bar 14a away from mounting plate 62. As mount bar 14a is actuated towards mounting plate 62, a load is applied to springs 14b. After removal of the load, springs 14b return mount bar 14a to its rest position. In view of the foregoing, it should be appreciated that a load is applied to mount bar 14a during each instance of a hook, e.g., slide hook 24 and post hooks 32, passing by mount bar 14a. Moreover, in order to release a hook from a mount bar so that slide post 22 or main post 30 may pass by the mount bar, a load must be applied to mount bar 14a in a direction opposite than uni-directional arrow 20, for example, by an operator.

Slide post 22 and main post 30 are arranged in a nested relationship. The nested arrangement is described herein. In order to permit the free movement of slide post 22 relative to main post 30, main post 30 is positioned partially within opening 68 and moves vertically within opening 68 and slot 70. Embodiments using the foregoing arrangement are set forth herebelow.

The nature of the operation of the present invention scaffold system will now be more fully explained. The operation differs depending upon the direction of movement, i.e., upwardly or downwardly. First, upward movement of scaffold system 10 is discussed.

In order to move scaffold system 10 upwardly, first wall mount 14 is secured to structure 12 at height 42 and second wall mount 16 is secured to structure 12 at height 44. Post hook 32 is releasably engaged with second wall mount bar 16a, while slide hook 24 is releasably engaged with first wall mount bar 14a. Next, third wall mount 46 is secured to structure 12 at height 48a, i.e., elevationally higher than first height 42 (as shown in FIG. 13). Then, ball screw jack 36 is energized causing ball screw jack 36 to extend lifting screw 40 thereby increasing the vertical height of slide post 22. The actuation of ball screw jack 36 releasably engaged slide hook 24 with third wall mount bar 46a. Next, ball screw jack 36 is energized causing ball screw jack 36 to retract lifting screw 40 thereby increasing the vertical height of main post 30. The actuation of ball screw jack 36 releasably engaged post hook 32 with first wall mount bar 14a.

Alternatively, scaffold system 10 may be used to move down a structure. The following describes the steps of moving the scaffold in a downward direction. Similar to the method described above, first wall mount 14 is secured to structure 12 at height 42 and second wall mount 16 is secured to structure 12 at height 44. Post hook 32 is releasably engaged with second wall mount bar 16a, while slide hook 24 is releasably engaged with first wall mount bar 14a. Next, third wall mount 46 is secured to structure 12 at height 48b, i.e., elevationally lower than second height 44. Then, ball screw jack 36 is energized causing ball screw jack 36 to extend lifting screw 40 thereby decreasing the vertical height of main post 30. The actuation of ball screw jack 36 releasably engages post hook 32 with third wall mount bar 46a. Next, ball screw jack 36 is energized causing ball screw jack 36 to retract lifting screw 40 thereby decreasing the vertical height of slide post 22. The actuation of ball screw jack 36 releasably engaged slide hook 24 with second wall mount bar 16a.

The present invention includes other features which increase its safety, utility and effectiveness. For example, main post 30 may include elevations marked at various increments, e.g., six inch increments, which assist in keeping the entire system, i.e., multiple adjacent scaffold systems 10, at the same elevations. Moreover, such markings provide an operator feedback regarding how much travel remains on lifting screw 40. Still further, in an embodiment, the lower work deck, which is used to operate scaffold system 10, is modified to allow access from an exterior elevator and ladder system. Even yet further, in an embodiment, scaffold system 10 may be fitted with a separate hoist to transport equipment and materials to the work area.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A scaffold system adapted for securing to a structure and for vertical movement relative to the structure, the scaffold system comprising:
   first and second wall mounts, each of the wall mounts comprising a bar and at least one spring biasing the bar in a first direction;
   a slide post comprising a slide hook, a slide arm and a hanging pad secured to the slide arm, the slide post arranged for vertical axial movement within at least one of the first and second wall mounts;
   a main post comprising at least one post hook;
   a first deck fixedly secured to the main post; and,
   a ball screw jack comprising a mounting plate and a lifting screw, the mounting plate secured to the first deck and the lifting screw secured to the hanging pad, wherein when said ball screw jack is powered said lifting screw causes the entire slide post to move upward at the same rate as the lifting screw, wherein the main post is arranged to complementarily fit within the slide post, the slide hook is adapted for releasable engagement with the first wall mount bar or the second wall mount bar and the at least one post hook is adapted for releasable engagement with the first wall mount bar or the second wall mount bar.

2. The scaffold system of claim 1 wherein the first wall mount is secured to the structure at a first height, the second wall mount is secured to the structure at a second height elevationally lower than the first height and the slide hook is releasably engaged with the first wall mount bar.

3. The scaffold system of claim 1 wherein the first wall mount is secured to the structure at a first height, the second wall mount is secured to the structure at a second height elevationally lower than the first height and the at least one post hook is releasably engaged with the second wall mount bar.

4. The scaffold system of claim 1 wherein the first wall mount is secured to the structure at a first height, the second wall mount is secured to the structure at a second height elevationally lower than the first height, the slide hook is releasably engaged with the first wall mount bar and the at least one post hook is releasably engaged with the second wall mount bar.

5. The scaffold system of claim 1 further comprising a third wall mount comprising a bar and at least one spring biasing the bar in a first direction, wherein the first wall mount is secured to the structure at a first height, the second wall mount is secured to the structure at a second height elevationally lower than the first height, the third wall mount is secured to the structure at a third height elevationally lower than the second height and the slide hook is releasably engaged with the first wall mount bar and the at least one post hook is releasably engaged with the third wall mount bar.

6. The scaffold system of claim 1 further comprising a third wall mount comprising a bar and at least one spring biasing the bar in a first direction, wherein the first wall mount is secured to the structure at a first height, the second wall mount is secured to the structure at a second height elevationally lower than the first height, the third wall mount is secured to the structure at a third height elevationally higher than the first height and the slide hook is releasably engaged with the third wall mount bar and the at least one post hook is releasably engaged with the first wall mount bar or the second wall mount bar.

7. The scaffold system of claim 1 further comprising at least one limit switch arranged to engage the hanging pad or the slide arm.

8. The scaffold system of claim 1 further comprising a second deck positioned elevationally higher than the first deck.

9. The scaffold system of claim 1 further comprising at least one safety lug secured to the structure and the first deck.

10. A method of modifying the height of a scaffold system mounted on a structure, the scaffold system comprising first and second wall mounts, a slide post comprising a slide hook, a slide arm and a hanging pad secured to the slide arm, a main post comprising at least one post hook, a first deck fixedly secured to the main post, and a ball screw jack comprising a mounting plate and a lifting screw, wherein each of the wall mounts comprises a bar and at least one spring biasing the bar in a first direction, the slide post is arranged for vertical axial movement within at least one of the first and second wall mounts, the mounting plate is secured to the first deck, the lifting screw is secured to the hanging pad, the main post is arranged to complementarily fit within the slide post, the slide hook is adapted for releasable engagement with the first wall mount bar or the second wall mount bar and the at least one post hook is adapted for releasable engagement with the first wall mount bar or the second wall mount bar, the method comprising:
   a) securing the first wall mount to the structure at a first height and securing the second wall mount to the structure at a second height elevationally lower than the first height;
   b) releasably engaging the at least one post hook with the second wall mount bar;
   c) releasably engaging the slide hook with the first wall mount bar;
   d) securing a third wall mount to the structure at a third height elevationally higher the first height, the third wall mount comprises a bar and at least one spring biasing the bar in a first direction;
   e) energizing the ball screw jack, wherein the ball screw jack extends the lifting screw thereby increasing a vertical height of the slide post;
   f) releasably engaging the slide hook with the third wall mount bar;
   g) energizing the ball screw jack, wherein the ball screw jack retracts the lifting screw thereby increasing the vertical height of the main post; and,
   h) releasably engaging the at least one post hook with first wall mount bar.

11. A method of modifying the height of a scaffold system mounted on a structure, the scaffold system comprising first and second wall mounts, a slide post comprising a slide hook, a slide arm and a hanging pad secured to the slide arm, a main post comprising at least one post hook, a first deck fixedly secured to the main post, and a ball screw jack comprising a mounting plate and a lifting screw, wherein each of the wall mounts comprises a bar and at least one spring biasing the bar in a first direction, the slide post is arranged for vertical axial movement within at least one of the first and second wall mounts, the mounting plate is secured to the first deck, the lifting screw is secured to the hanging pad, the main post is arranged to complementarily fit within the slide post, the slide hook is adapted for releasable engagement with the first wall mount bar or the second wall mount bar and the at least one post hook is adapted for releasable engagement with the first wall mount bar or the second wall mount bar, the method comprising:
   a) securing the first wall mount to the structure at a first height and securing the second wall mount to the structure at a second height elevationally lower than the first height;
   b) releasably engaging the at least one post hook with the second wall mount bar;
   c) releasably engaging the slide hook with the first wall mount bar;
   d) securing a third wall mount to the structure at a third height elevationally lower the second height, the third wall mount comprises a bar and at least one spring biasing the bar in a first direction;
   e) energizing the ball screw jack, wherein the ball screw jack extends the lifting screw thereby decreasing a vertical height of the main post;
   f) releasably engaging the at least one post hook with the third wall mount bar;
   g) energizing the ball screw jack, wherein the ball screw jack retracts the lifting screw thereby decreasing the vertical height of the slide post; and,
   h) releasably engaging the slide hook with second wall mount bar.

* * * * *